Sept. 27, 1932.　　　A. E. NEWTON　　　1,879,426
ELECTRICALLY HEATED UTENSIL
Filed Feb. 19, 1931　　2 Sheets-Sheet 1

Inventor:
Albert E. Newton
by Richard E. Babcock
Attorney

Sept. 27, 1932.   A. E. NEWTON   1,879,426
ELECTRICALLY HEATED UTENSIL
Filed Feb. 19, 1931   2 Sheets-Sheet 2

Inventor
Albert E. Newton
by Richard E. Babcock
Attorney

Patented Sept. 27, 1932

1,879,426

UNITED STATES PATENT OFFICE

ALBERT EDWARD NEWTON, OF BIRMINGHAM, ENGLAND, ASSIGNOR TO PREMIER ELECTRIC HEATERS LIMITED, OF BIRMINGHAM, ENGLAND

ELECTRICALLY HEATED UTENSIL

Application filed February 19, 1931, Serial No. 517,054, and in Great Britain March 25, 1930.

This invention relates to electrically heated domestic utensils and refers more particularly to electrically heated kettles, cooking utensils or irons, which include an electric switch adapted to be opened automatically by the action of a thermostat in the event of the utensil becoming overheated, due to the heater circuit remaining switched on after the utensil has been emptied or nearly emptied, or in the case of an iron, due to the current being left on while the iron is stationary upon the work or on the table.

In common with other devices of this class the present apparatus comprises a movable switch member which is acted upon by a spring which tends to open the switch, and a releasable catch is provided for keeping the switch closed until it is opened by the action of the thermostat.

In connection with such apparatus it has been proposed to arrange the thermostat so that it acts upon the movable switch member, allowing the latter to move laterally so that it becomes released from the catch and can then move in an endwise direction under the influence of a spring.

In such construction, however, where the thermostat acts directly upon the movable switch member if the movable switch member is reset before the thermostat cools, there is always the possibility that the thermostat may become bent or distorted by the switch member as it is moved back into its closed position, and one of the objects of the present invention is to overcome this difficulty.

Another object of this invention is to provide a generally improved automatic thermostatic switch apparatus of the kind specified.

According to one feature of this invention I provide an automatic switch for electrically heated utensils comprising a switch adapted to be controlled by a thermostat and intermediate catch mechanism through which the thermostat controls the switch without being directly subject to stress by the switch.

With this arrangement the switch can be closed freely without danger of injury to the thermostat.

According to another feature of the invention the thermostat is so disposed as normally not to be subjected to any stress from the switch operating spring.

According to a still further feature of the invention the switch normally tends to open, but normally is retained closed by a catch, the force exerted by the catch to retain the switch closed being less than that which tends to open the switch, this reduction being effected by an intermediate lever or leverage system. This reduction of pressure enables a catch to be constructed which is very light in operation and requires only the application of a minimum of force to actuate it.

Further features of the invention will become evident as this specification proceeds.

Referring to the drawings:—

Figure 1:
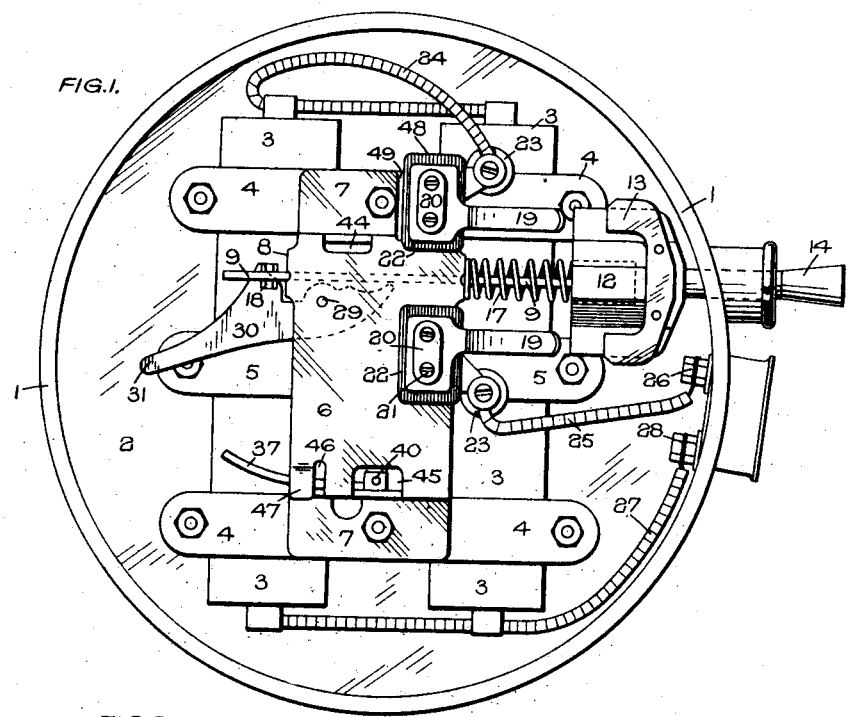
Figure 1 is an inverted plan of a utensil for heating liquids having this invention applied thereto.
Figure 2:
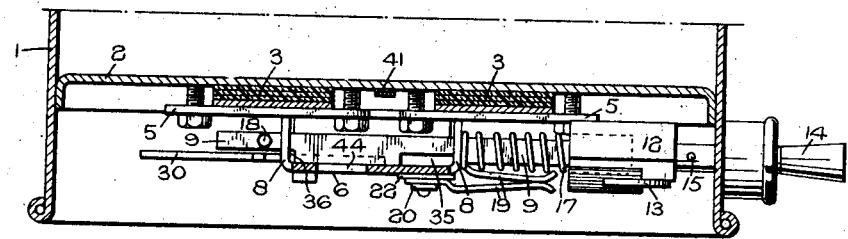
Figure 2 is a cross sectional elevation of the lower part of the same heating utensil.

Referring to the drawings, 1 is the body of the heating utensil and 2 is the bottom thereof which is disposed above the lower edge of the body 1.

To the bottom 2 are secured the usual heating elements 3 by means of clamping bars 4, 4 and 5, 5.

To and across the clamping bars 4, 4 is fixed a bridge-like bracket 6. This bracket is of substantially flanged U shape in cross section, the flanges 7 serving to secure the bracket to the clamping members 4, 4.

Figure 6:
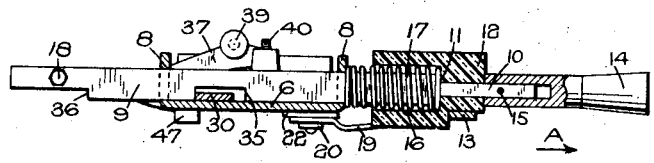
Figure 6 is a section on line 6—6, Figure 3.

The bracket 6 is made as a one-piece metal pressing and is provided with a pair of ears 8 which are bent upwardly as shown clearly in Figure 6, and each of these ears is provided with a slot in which slides a switch arm or bar 9 of rectangular cross section.

The switch bar 9 is reduced to provide a portion 10 and a shoulder 11, and on the portion 10 is mounted a block 12 of porcelain or other suitable insulating material which carries a metal bridge 13 of U shape in plan.

The portion 10 of the switch bar 9 extends through the porcelain block 12 and is provided on its outer end with a handle 14 secured in position by a pin or bolt 15 and extending through the body 1 of the heating utensil and serving for resetting the switch after the latter has been opened.

The porcelain block 12 has a recess 16 in which is housed one end of a coiled spring 17 mounted upon the switch bar 9 and having its other end abutting the adjacent ear 8 on the bridge 6. This spring tends to push the switch bar in the direction of the arrow "A" Figure 6 and to open the switch, and the extent to which the switch bar 9 is slidable in this direction is limited by a stop 18 which may comprise a nut and bolt passed through the switch bar, or any other equivalent means.

The bridge 13 on the porcelain block 12 forms the moving part of the switch, and the stationary part of the switch comprises two spaced spring jaws 19 insulated from one another.

Each jaw 19 conveniently comprises a pair of suitably bent spring metal arms secured to the bridge 6 and insulated therefrom.

The spring arms may be secured in position by clamping plates 20 and nuts and bolts 21, the insulation being effected by sheets 22 of mica or other suitable material. The bolts 21 carry negative and positive terminals 23, to one of which a lead 24 from the heating element is connected, and to the other of which is connected a lead 25 from a terminal 26. A lead 27 is also taken from a terminal 28 to the heating element.

Current is supplied to the heating element from a suitable source by means of a plug engaged with the terminals 26 and 28 which are adjacent and arranged in the usual manner. The current flows through the circuit which may be made or broken by moving the bridge 13 into or out of engagement with the spring jaws 19. The circuit is shown broken in Figure 1.

Figure 3:
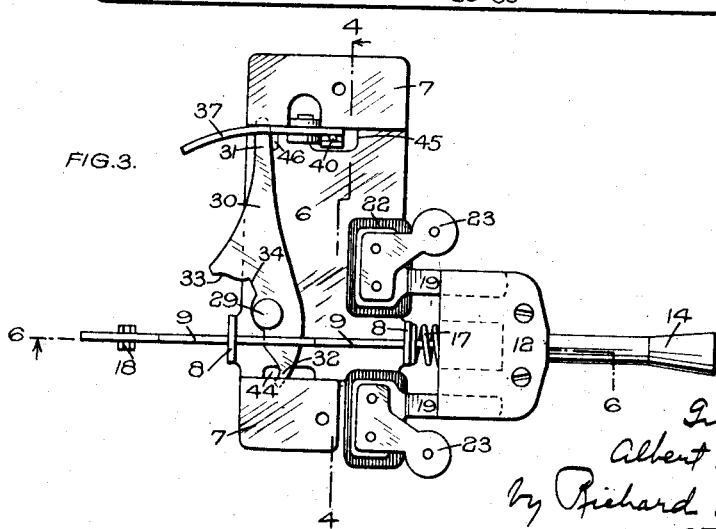
Figure 3 is a plan view of automatic switch mechanism according to this invention.

To the bridge 6 is pivoted on a pivot pin 29 an intermediate lever 30 of substantially the shape illustrated clearly in Figures 1 and 3. This lever has a long arm 31 and a short arm or heel 32. It has also a cam portion 33 and a shoulder 34.

The heel 32 of the lever 30 is adapted for engagement in a slot or recess 35 provided in the lower edge of the switch bar 9, and the shoulder 34 is adapted to engage with one of the upstanding ears 8 on the bridge piece 6 for limiting the movement of the lever 30 in one direction, whilst the cam portion 33 of the lever engages with a shoulder or projection 36 on the switch bar 9 to turn slightly the lever 30 on its pivot so as to bring the heel 32 of the lever into the slot 35 during the switch closing movement of the switch bar.

When the switch is open as shown in Figure 1, the heel 32 is disengaged from the switch bar 9 as is illustrated clearly, and this permits of a certain amount of movement of the switch bar without a corresponding movement of the lever 30.

Figure 4:
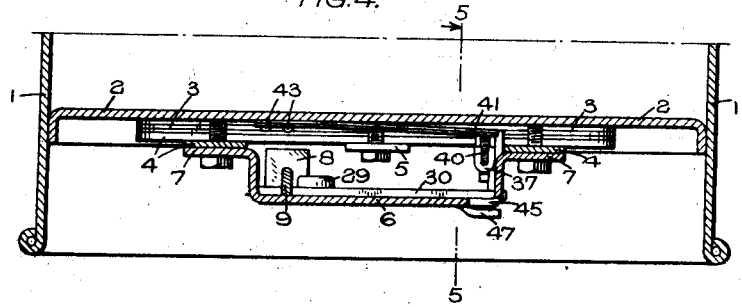
Figure 4 is a section on line 4—4, Figure 3.
Figure 5:
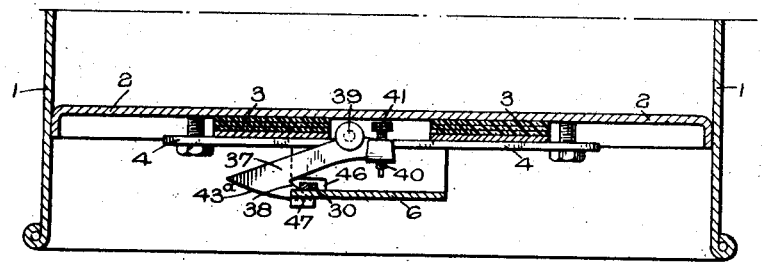
Figure 5 is a section on line 5—5, Figure 4.

The arm 31 of the lever 30 is adapted to be engaged for retaining the switch closed, i. e. in the position shown in Figure 3, by a catch lever 37 (see particularly Figures 3 and 5) having an undercut hook-like end 38 adapted to engage over the arm 31 of the lever 30. This lever is pivoted on a pivot pin 39 between its ends. The hooked end of the lever is longer than the other end, and the latter carries an adjustable screw 40, with the upper end of which is adapted to engage the free end of a bi-metal blade 41 forming a thermostat and secured by one end to the bottom 2 of the heating utensil at 43 as shown in Figure 4.

Alternatively, the bi-metal blade 41 may be secured to the bridge 6 or a part associated therewith.

Whereas the pivot pin 29 upon which the lever 30 is mounted is disposed vertically so that the lever 30 lies and moves in a horizontal plane, the pivot pin 39 for the catch lever 37 is disposed horizontally and the lever 37 moves in a vertical plane.

The catch lever 37 is curved in its length in plan as shown in Figure 3 so that the lever is adjacent the toe 31 of the lever 30 in spite of the circular movement made by such toe. Also the under edge 43a of the lever 37 is curved so as to facilitate the engagement of the toe 31 of the lever 30 with the hooked part of the lever 37. The last named lever may be pressed into its lower position by spring means or may rely entirely upon gravity as in the example shown in the drawings.

An aperture 44 (Figures 1 and 3) is formed in the bridge 6 to permit of the free movement of the heel 32 of the lever 30.

A further aperture 45 is formed in the bridge 6 to permit of adjustments of the adjusting screw 40 in the catch lever 37.

A portion of the channel bridge member 6 is removed at 46 to allow of the toe 31 of the lever 30 swinging into engagement with the hook of the catch lever 37 and the portion 47 of the bridge adjacent the part 46 is cranked slightly downwardly and forms a stop for limiting the downward movement of the catch lever 37.

One of the spring jaws 19 is carried by an integral portion 48 of the bridge member 6, which portion is separated at 49 from the part forming the adjacent flange of the U bridge member.

The toe portion of the lever 30 is considerably longer than the heel portion thereof, whereby the force exerted by the catch lever on the lever 30 to retain the switch closed is considerably less than the force exerted by the spring 17 on the switch bar. This arrangement makes the catch system very light in operation and therefore such mechanism requires only a minimum of pressure from the thermostat.

The operation of the switch hereinbefore described is as follows. Assuming that the parts of the switch are in the position shown in Figure 1 of the drawings, and it is desired to close the switch, the switch bar 9 is pushed inwardly until the bridge 13 connects electrically the spring jaws 19.

Pushing inwardly the bar 9 causes the shoulder 36 thereon to engage the cam surface 39 on the lever 30 and so push the toe of this lever slightly away from the switch bar, bringing the heel 32 of the lever 30 into the slot 35 in the switch bar. Continued endwise motion of the switch bar 9 sends the toe 31 of the lever 30 round until this toe rides under the curved surface 43 of the catch lever 37 into the hooked end of the latter, when the catch lever falls and secures the lever 30 in the position shown in Figure 3 and so retains the switch closed.

During these operations, and subsequently while the switch is retained closed, the thermostat 41 is not subjected to any stress by the switch spring or the mechanism connected therewith.

When the heating utensil becomes overheated, the thermostat 41 bends or curls in the manner usual with bi-metal thermostats and the free end of the thermostat engages the upper end of the adjustable screw 40 in the catch lever 37 and depresses the adjacent end of the catch lever so raising the hooked end of the latter. This releases the toe 31 of the lever 30 and the switch bar 9 is free to slide in an outward direction under the action of the spring 17 to open the switch and return the parts to the position shown in Figure 1. The swinging motion of the lever 30 is arrested by the engagement of the shoulder 34 thereof with one of the ears 8 on the bridge 6.

All that it is necessary to do to reset the switch when the latter has cooled down is to push inwardly the switch bar 9 which effects the operations described.

Preferably the bridge 6, levers 30 and 37, switch bar 9, terminals 23, bridge 13 and the spring jaws 19 are all formed as metal pressings.

Claims:—

1. An automatic switch for electrically heated utensils comprising a switch having a fixed and a movable part, a catch lever, a thermostat adapted to actuate said catch lever at a predetermined temperature, an intermediate lever having a short heel portion and a comparatively long toe part, the latter being adapted to engage the said catch lever and the heel part being capable of association with the movable switch part for retaining the switch closed, and means always tending to open said switch.

2. An automatic switch for electrically heated utensils comprising a switch having a fixed and a movable part, a slidable switch bar on which said movable switch part is carried, a catch lever, a thermostat adapted to actuate said catch lever at a predetermined temperature, an intermediate pivoted lever having a short heel portion and a longer toe part, the latter being adapted to be engaged by the catch lever and the former being engageable in a slot provided in said switch bar, and means always tending to open said switch.

3. An automatic switch for electrically heated utensils comprising a switch having a fixed and a movable part, a slidable switch bar on which said movable switch part is carried, a fulcrumed double ended catch lever disposed substantially parallel to the switch bar and spaced therefrom, a thermostat adapted to actuate said catch lever at a predetermined temperature and operating on one end of said lever, the opposite end of the catch lever being of hook like formation, an intermediate pivoted lever having a short heel portion and a longer toe part, the latter being adapted to be engaged by the hooked end of the catch lever and the former being engageable in a slot provided in said switch bar, the said intermediate lever being arranged, when set to retain the switch closed, to extend from the switch bar to the catch lever and to engage both, and means always tending to open said switch.

4. An automatic switch for electrically heated utensils comprising a switch having a fixed and a movable part, a bridge-like supporting member, a slidable switch bar on which said movable switch part is carried and mounted slidably on said supporting member, a catch lever pivoted intermediate its ends to said supporting member and disposed substantially parallel to the switch bar and spaced therefrom, a thermostat adapted to actuate said catch lever at a predetermined temperature and operating on one end of said lever, the opposite end of the catch lever being of hook like formation, a pivot mounted on said support and disposed between the said switch bar and the catch lever, an intermediate lever pivoted between its ends on said pivot and having a heel portion and a toe part, the latter being adapted to be engaged by the hooked end of the catch lever, and the former being engageable in a slot provided in the said switch bar and adapted to bear on one end of said slot and spring means on the said switch bar for opening the said switch.

5. An automatic switch for electrically heated utensils comprising a switch having a fixed and a movable part, a bridge-like supporting member, a slidable switch bar mounted in said supporting member, having a slot, and carrying said movable switch part, a catch lever pivoted between its ends to said supporting member and disposed substantially parallel to the switch bar and spaced therefrom, a thermostat adapted to actuate said catch lever at a predetermined temperature and operating on one end of said catch lever, the opposite end of the catch lever being of hook like formation, an intermediate lever pivoted between its ends to said support, the said pivot of the intermediate lever being disposed between the said switch bar and the catch lever, and the said intermediate lever having a heel portion and a longer toe part, the latter being adapted to be engaged by the hooked end of the catch lever, and the former being engageable in the slot in the said switch bar and adapted to bear on one end of said slot, said heel being free to leave the said slot after the intermediate lever has been released whereby the switch bar may move independently of the intermediate lever, spring means on the said switch bar for opening the said switch, and co-operating means on the said switch bar and intermediate lever adapted to ensure the engagement of the heel of the intermediate lever in the slot of the switch bar as the switch is being closed.

6. An automatic switch for electrically heated utensils comprising a switch having a fixed and a movable part, a bridge-like supporting member on which the fixed part of said switch is mounted, a slidable switch bar on which said movable switch part is carried, spaced ears on said bridge member in which said switch bar is slidably mounted, a further ear on said bridge member, a catch lever pivoted between its ends to said further ear and disposed substantially parallel to the switch bar and spaced therefrom, a strip bi-metal thermostat having one end fixed and the other end adapted to operate on one end of said catch lever, means on this end of the catch lever for adjusting the time at which the thermostat operates on the catch lever, the opposite end of the catch lever being of hook like formation and curved, an intermediate lever pivoted between its ends to said support on a pivot perpendicular to the catch lever pivot, and also disposed between the said switch bar and the catch lever, the said intermediate lever having a heel portion and a longer toe part, the latter being adapted to be engaged by the hooked end of the catch lever, and the former being engageable in a slot provided in the said switch bar and adapted to bear on one end of said slot, said heel being free to leave the said slot after the intermediate lever has been released whereby the switch bar may move independently of the intermediate lever, spring means on the said switch bar for opening the said switch, co-operating shoulder and cam means on the said switch bar and intermediate lever adapted to ensure the engagement of the heel of the intermediate lever in the slot of the switch bar as the switch is being closed, and stop means for limiting the movement of the intermediate and catch levers and the switch bar.

7. An automatic switch for electrically heated utensils comprising, a two part switch, an endwise slidable switch bar carrying one of said switch parts, a catch lever adapted to control the said switch, a thermal control element adapted to actuate said catch lever at a predetermined temperature, an intermediate lever pivoted between its ends and associated with said switch bar and normally engaged with said catch lever to retain the switch closed but being released, to permit the switch to open, on said predetermined temperature being attained, and means tending to open said switch.

8. An automatic switch for electrically heated utensils comprising, a switch having a fixed part and a movable part, means tending to open said switch, a catch lever adapted to control the said switch, a thermal control element adapted to actuate said catch, and an intermediate reducing lever associated with said movable switch part and normally engaged by the catch lever to retain the switch open, such reducing lever also being adapted so that the force exercised by the catch on the part of said reducing lever with which it engages to retain the switch closed is appreciably less than the force exercised by the switch opening means to open the switch.

9. An automatic switch for electrically heated utensils comprising, a two part switch, an endwise slidable switch bar carrying one of said switch parts, an intermediate lever pivoted between its ends on an axis transverse to the length of said switch bar, and adapted to engage the latter with one end, means tending to open said switch, a catch lever disposed transversely to the length of said intermediate lever and engageable with the other end of the latter to retain the switch closed, and a thermal element adapted to actuate said catch lever at a predetermined temperature and so to disengage it from and release said intermediate lever thus permitting the switch to open.

10. An automatic switch for electric heating utensils, comprising a switch proper having a relatively stationary contact and a movable contact, an endwise slidable switch bar mounted in guides and carrying the said movable contact, spring means for moving said switch bar in an endwise direction to open said switch proper, an intermediate pivoted lever adapted to engage an abutment on the slidable switch bar, a catch lever adapted to engage the said intermediate lever and so to retain the said switch bar against endwise movement, and a bi-metal thermal element the line of movement of the free end of which is transverse to the length of the element and which element controls through the said catch lever the movement of the said intermediate lever and effects the release of the switch bar only when the utensil, or part thereof, reaches a predetermined temperature.

In witness whereof I affix my signature.

ALBERT EDWARD NEWTON.